(12) United States Patent
Ihara

(10) Patent No.: US 12,139,199 B2
(45) Date of Patent: Nov. 12, 2024

(54) STRUCTURAL MEMBER

(71) Applicant: KABUSHIKI KAISHA KOBE SEIKO SHO (KOBE STEEL, LTD.), Hyogo (JP)

(72) Inventor: Ryohei Ihara, Kobe (JP)

(73) Assignee: KOBE STEEL, LTD., Hyogo (JP)

( * ) Notice: Subject to any disclaimer, the term of this patent is extended or adjusted under 35 U.S.C. 154(b) by 380 days.

(21) Appl. No.: 17/632,780

(22) PCT Filed: Jul. 30, 2020

(86) PCT No.: PCT/JP2020/029329
§ 371 (c)(1),
(2) Date: Feb. 3, 2022

(87) PCT Pub. No.: WO2021/039272
PCT Pub. Date: Mar. 4, 2021

(65) Prior Publication Data
US 2022/0281528 A1 Sep. 8, 2022

(30) Foreign Application Priority Data
Aug. 29, 2019 (JP) .................. 2019-156958

(51) Int. Cl.
*B62D 21/15* (2006.01)
*B21D 39/02* (2006.01)
*B62D 29/00* (2006.01)

(52) U.S. Cl.
CPC ........... *B62D 21/15* (2013.01); *B21D 39/021* (2013.01); *B62D 29/007* (2013.01)

(58) Field of Classification Search
CPC .... B62D 21/15; B62D 29/007; B21D 39/021; B21D 53/88; B21D 39/02; F16B 4/00; F16B 5/00; F16B 5/08; F16B 11/00
See application file for complete search history.

(56) References Cited

U.S. PATENT DOCUMENTS 6,622,450 B2 * 9/2003 Nees ...................... B60J 5/0444
296/202
9,452,462 B2 * 9/2016 Elgimiabi .................. C09J 5/06
(Continued)

FOREIGN PATENT DOCUMENTS

JP 2000-158064 A 6/2000
JP 2015-196326 A 11/2015
(Continued)

OTHER PUBLICATIONS

International Preliminary Report on Patentability and Written Opinion issued in PCT/JP2020/029329; mailed Mar. 10, 2022.
(Continued)

*Primary Examiner* — Patrick J Maestri
(74) *Attorney, Agent, or Firm* — Studebaker & Brackett PC

(57) ABSTRACT

A structural member is elongated in a longitudinal direction, and includes a first member made of a steel plate and a second member made of a steel plate, the first member and the second member being joined. In the structural member, a closed cross-sectional shape is formed by the first member and the second member in a cross section perpendicular to the longitudinal direction. The first member has a tensile strength of equal to or greater than 980 MPa, and includes a first hemming process part subjected to hemming bending at both end parts in a width direction orthogonal to the longitudinal direction. The second member has a tensile strength of equal to or greater than 980 MPa, and includes a second bonded part held in the first hemming process part at both end parts in the width direction and bonded to the first hemming process part by an adhesive.

18 Claims, 4 Drawing Sheets

(56) References Cited

U.S. PATENT DOCUMENTS

| | | | | |
|---|---|---|---|---|
| 2007/0245541 A1* | 10/2007 | Kanaguchi | ................ | F16B 5/08 |
| | | | | 29/557 |
| 2013/0113237 A1* | 5/2013 | Huhn | ..................... | B62D 25/04 |
| | | | | 296/193.06 |
| 2015/0275382 A1 | 10/2015 | Urayama et al. | | |
| 2017/0233008 A1 | 8/2017 | Otsuka et al. | | |
| 2017/0314116 A1 | 11/2017 | Kawata et al. | | |
| 2018/0306093 A1 | 10/2018 | Gerlich | | |

FOREIGN PATENT DOCUMENTS

| | | |
|---|---|---|
| JP | 2018-114969 A | 7/2018 |
| JP | 2018-179005 A | 11/2018 |
| JP | 2019-025529 A | 2/2019 |
| JP | 2019-116224 A | 7/2019 |
| WO | 2016/035851 A1 | 3/2016 |
| WO | 2016/072479 A1 | 5/2016 |

OTHER PUBLICATIONS

International Search Report issued in PCT/JP2020/029329; mailed Oct. 6, 2020.

* cited by examiner

STRUCTURAL MEMBER

CROSS-REFERENCE TO RELATED APPLICATIONS

This is a national phase application in the United States of International Patent Application No. PCT/JP2020/029329 with an international filing date of Jul. 30, 2020, which claims priority of Japanese Patent Application No. 2019-156958 filed on Aug. 29, 2019 the contents of which are incorporated herein by reference.

TECHNICAL FIELD

The present invention relates to a structural member.

BACKGROUND ART

There is a need for using a high-strength steel plate for a vehicle body structure for safety and weight reduction of an automobile. However, the high-strength steel plate is excellent in strength but is difficult to join. For example, welding of a high-strength steel plate is not easy, and mechanical fastening is also often difficult from the viewpoint of workability.

JP 2018-114969 A discloses a vehicle structural member obtained by joining two steel plates (first member and second member). The first member is set to have a higher tensile strength than the second member has, and in particular, the tensile strength of the first member can be equal to or greater than 980 MPa. In order to join such a high-strength steel plate, in the vehicle structural member of JP 2018-114969 A, the end part in the width direction of the second member having relatively low strength is bent to form a hemming process part, and the flange part of the first member having relatively high strength is held in the hemming process part. The first member and the second member are joined by bonding the hemming process part and the flange part with an adhesive.

SUMMARY

In the vehicle structural member of JP 2018-114969 A, hemming bending is applied to the second member having relatively low strength. However, in the structural member, both members are high-strength steel plates, and there may be no difference in strength between the high-strength steel plates. JP 2018-114969 A does not mention in detail a case where both members are high-strength steel plates, and has room for improvement.

An object of the present invention is to provide a structural member in which two high-strength steel plates are strongly joined without welding or mechanical fastening.

The present invention provides a structural member including: a first member made of a steel plate; and a second member made of a steel plate, the structural member being elongated in a longitudinal direction, the first member and the second member being joined, in which a closed cross-sectional shape is formed by the first member and the second member in a cross section perpendicular to the longitudinal direction, the first member has a tensile strength of equal to or greater than 980 MPa, and includes a first hemming process part subjected to hemming bending at both end parts in a width direction orthogonal to the longitudinal direction, and the second member has a tensile strength of equal to or greater than 980 MPa, and includes a second bonded part held in the first hemming process part at both end parts in the width direction and bonded to the first hemming process part by an adhesive.

According to this configuration, since both the first member and the second member are high-strength steel plates having a tensile strength of equal to or greater than 980 MPa, a high-strength structural member can be provided. Since the first member has the first hemming process part, rigidity can be improved as compared with a case where the first member is a simple flat plate. Since the second bonded part of the second member is held in the first hemming process part of the first member and bonded by an adhesive, strong joining can be achieved without welding or mechanical fastening.

A $\lambda$ value of the first member may be equal to or greater than 50%.

According to this configuration, it is possible to suppress process defects such as cracking in the first hemming process part of the first member. In general, a high-strength steel plate having a tensile strength of equal to or greater than 980 MPa often has poor workability and is not suitable for hemming bending. However, when the $\lambda$ value (index value defined in JIS-Z2256) of the material of the first member is defined to be equal to or greater than 50%, the hemming bending can be suitably performed while suppressing cracking and the like. Originally, the $\lambda$ value is an index related to the hole expansion ratio, but the inventor of the present application has found that there is a correlation between the $\lambda$ value and the hemming bending workability. Specifically, when the $\lambda$ value is equal to or greater than 50%, the hemming bending can be suitably performed.

A value obtained by dividing the curvature radius of the first hemming process part by the plate thickness may be equal to or greater than 1.0.

According to this configuration, it is possible to suppress process defects such as cracking in the first hemming process part of the first member. As described above, a high-strength steel plate having a tensile strength of equal to or greater than 980 MPa often has poor bending workability and is not suitable for hemming bending. Therefore, by setting the value obtained by dividing the curvature radius of the first hemming process part by the plate thickness to equal to or greater than 1.0, it is possible to achieve the first hemming process part with high dimensional accuracy without causing unreasonable deformation.

The adhesive may have a thermosetting property. The adhesive may have room-temperature curability.

According to these configurations, strong joining can be achieved by a highly versatile thermosetting or room-temperature-curable adhesive.

A plurality of the first hemming process parts may be intermittently disposed along the longitudinal direction.

According to this configuration, since a gap is provided between the first hemming process parts, the weight can be reduced as compared with the first hemming process part uniformly formed in the longitudinal direction. Since the structural member is easily crushed when an impact force is applied in the longitudinal direction, the impact absorption performance of the structural member can be improved.

The first member may include a plurality of first bonded parts intermittently along the longitudinal direction, the second member may include a plurality of second hemming process parts intermittently along the longitudinal direction, and the first bonded part of the first member may be held in the second hemming process part of the second member and bonded to the second hemming process part of the second member with an adhesive.

According to this configuration, since the first member includes the first hemming process part and the first bonded part, and the second member includes the second hemming process part and the second bonded part, the first member and the second member are in an aspect of being held between each other, and stronger joining can be achieved.

The λ value of the second member may be equal to or greater than 50%.

According to this configuration, similarly to the first hemming process part of the first member mentioned above, it is possible to suppress process defects such as cracking in the second hemming process part of the second member.

A value obtained by dividing the curvature radius of the second hemming process part by the plate thickness may be equal to or greater than 1.0.

According to this configuration, similarly to the first hemming process part of the first member mentioned above, it is possible to suppress process defects such as cracking in the second hemming process part of the second member. That is, by setting the value obtained by dividing the curvature radius of the second hemming process part by the plate thickness to equal to or greater than 1.0, it is possible to achieve the second hemming process part with high dimensional accuracy without causing unreasonable deformation.

The first hemming process part of the first member and the second hemming process part of the second member may be alternately disposed in the longitudinal direction, and the first bonded part of the first member and the second bonded part of the second member may be alternately disposed in the longitudinal direction.

According to this configuration, the first member and second member are in an aspect of being alternately held in the longitudinal direction, and stronger joining can be achieved.

The first member may have a flat plate shape, and the second member may have a hat-shaped cross section perpendicular to the longitudinal direction. The first member may have a hat-shaped cross section perpendicular to the longitudinal direction, and the second member may have a flat plate shape. Both the first member and the second member may have a hat-shaped cross section perpendicular to the longitudinal direction.

According to these configurations, it is possible to provide a structural member having a simple shape with high impact absorption performance. Here, the flat plate shape means a flat plate shape excluding a hemming processed part if any.

The structural member may be for a vehicle.

According to this configuration, it is possible to provide a vehicle structural member having high safety performance. In particular, since a structural member in which two high-strength steel plates are joined without welding or mechanical fastening has high impact absorption performance, safety performance against impact from the longitudinal direction of the structural member can be improved.

According to the present invention, both the first member and the second member are high-strength steel plates having a tensile strength of equal to or greater than 980 MPa, and the second bonded part of the second member is held in the first hemming process part of the first member and bonded by an adhesive. Therefore, it is possible to provide a structural member in which two high-strength steel plates are strongly joined without welding or mechanical fastening.

MODE FOR CARRYING OUT THE INVENTION

Embodiments of the present invention will be described below with reference to the accompanying drawings.

First Embodiment

Figure 1:
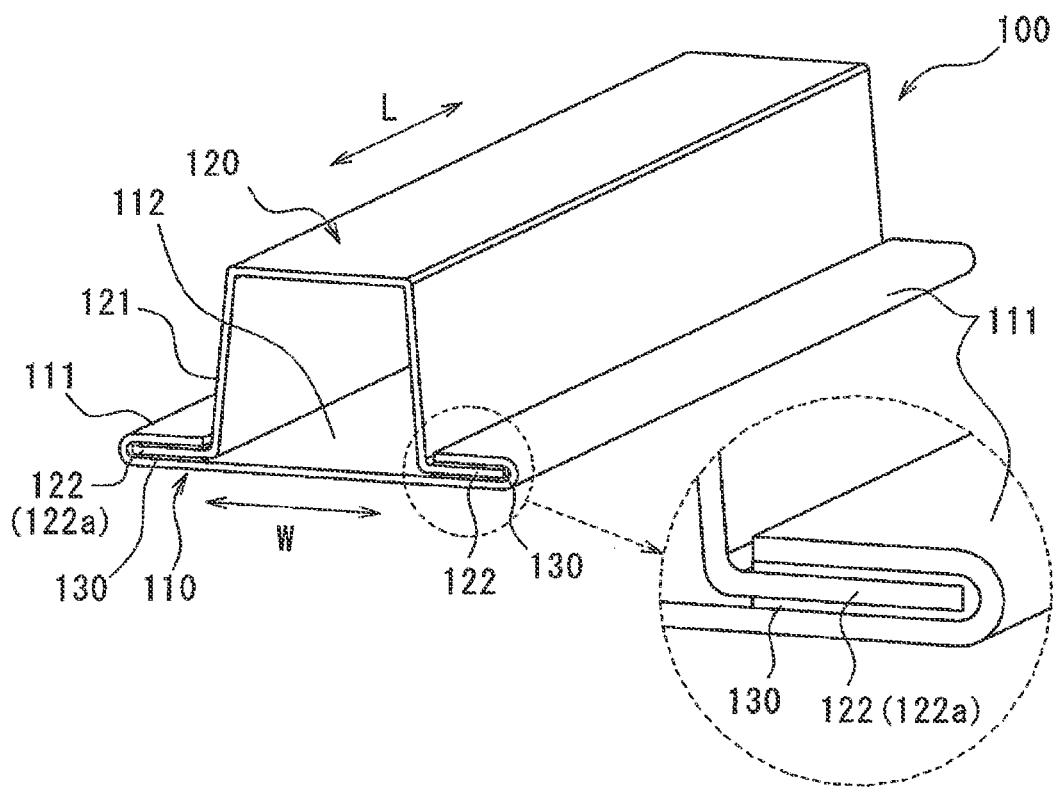
FIG. 1 is a perspective view of a structural member according to a first embodiment of the present invention.

Referring to FIG. 1, a structural member 100 of the present embodiment is elongated in a longitudinal direction L. The structural member 100 includes a first member 110 having a substantially flat plate shape and a second member 120 having a hat-shaped cross-sectional shape perpendicular to the longitudinal direction L. By joining the first member 110 and the second member 120, a trapezoidal closed cross-sectional shape is formed in a cross section perpendicular to the longitudinal direction L. In FIG. 1, a part indicated in a broken line circle is enlarged.

The first member 110 is a steel plate having a tensile strength of equal to or greater than 980 MPa. The first member 110 is formed by hemming bending both end parts in a width direction W (direction orthogonal to the longitudinal direction L) of the flat plate, but has a substantially flat plate shape. Here, the flat plate shape means a flat plate shape excluding a hemming processed part. Specifically, the center part in the width direction W is provided with a flat part 112 formed flat, and both end parts in the width direction W are provided with a first hemming process part 111 subjected to hemming bending.

Regarding the curvature radius of the first hemming process part 111, the value obtained by dividing the curvature radius by the plate thickness is preferably set to equal to or greater than 1.0. A high-strength steel plate having a tensile strength of equal to or greater than 980 MPa often has poor bending workability and is not suitable for hemming bending. In the present embodiment, by setting the value obtained by dividing the curvature radius of the first hemming process part 111 by the plate thickness to equal to or greater than 1.0, it is possible to suppress process defects such as cracking when hemming bending is applied, and it is possible to achieve the first hemming process part 111 with high dimensional accuracy without causing unreasonable deformation.

The material of the first member 110 preferably has a λ value of equal to or greater than 50%. The λ value is one of indices defined in JIS-Z2256, and generally indicates a hole expansion ratio. Originally, the λ value is an index related to the hole expansion ratio, but the inventor of the present application has found that there is a correlation between the λ value and the hemming bending workability. Specifically, when the λ value is equal to or greater than 50%, the hemming bending can be suitably performed. Therefore, in the present embodiment, by setting the λ value to equal to or greater than 50%, it is possible to suppress process defects such as cracking in the first hemming process part 111 of the first member 110.

The second member 120 is also a steel plate having a tensile strength of equal to or greater than 980 MPa. The second member 120 may be made of the same material as that of the first member 110, or may be made of a material different from that of the first member 110. For example, the second member 120 may have a λ value of less than 50%. The second member 120 is formed by bending a flat plate so that the shape of the cross section perpendicular to the longitudinal direction L is a hat shape. Specifically, the center part in the width direction W is provided with a recessed part 121 defining a closed cross-sectional shape together with the flat part 112, and the both end parts in the width direction W are provided with a flange part 122 continuously elongated outward in the width direction W from the recessed part 121.

In a state where the first member 110 and the second member 120 are joined, the flange part 122 of the second member 120 is held in the first hemming process part 111 of the first member 110. The flange part 122 is covered with the first hemming process part 111 so as not to be seen in plan view, i.e., substantially the entire surface of the flange part 122 is held in the first hemming process part 111. Therefore, in the present embodiment, the entire surface of the flange part 122 is a second bonded part 122a to which an adhesive 130 is applied.

The flange part 122 and the first hemming process part 111 are bonded to each other not by welding or mechanical fastening but by using the adhesive 130. The adhesive 130 is applied to the second bonded part 122a. The adhesive 130 can be a general-purpose adhesive, but it is preferable to have a thermosetting property in particular. This can achieve strong joining. Alternatively, the adhesive 130 may have room-temperature curability.

According to the present embodiment, since both the first member 110 and the second member 120 are high-strength steel plates having a tensile strength of equal to or greater than 980 MPa, the high-strength structural member 100 can be provided. Since the first member 110 has the first hemming process part 111, rigidity can be improved as compared with a case where the first member 110 is a simple flat plate. Since the second bonded part 122a of the second member 120 is held in the first hemming process part 111 of the first member 110 and bonded by the adhesive 130, strong joining can be achieved without welding or mechanical fastening.

Such the structural member 100 can be used for a front side member or a rear side member for a vehicle, for example. For example, the front side member is a member that can absorb collision energy by being buckled and deformed against a forward collision of the vehicle, and is a structural member required to have high impact absorption performance. Therefore, the structural member 100 is attached to the vehicle body by conforming the longitudinal direction L of the structural member 100 to the vehicle length direction so as to be buckled and deformed in the longitudinal direction L. The structural member 100 of the present embodiment has high impact absorption performance because two high-strength steel plates are joined without welding or mechanical fastening. Therefore, the structural member 100 of the present embodiment can improve safety performance against a forward collision of the vehicle. This is substantially the same also for a case where the structural member 100 of the present embodiment is applied to the rear side member.

(First Modification)

A first modification of the first embodiment will be described with reference to FIG. 2.

In the present modification, in the first member 110, a plurality of the first hemming process parts 111 are intermittently disposed along the longitudinal direction L. Specifically, the first hemming process parts 111 are disposed with a gap S1 at equal intervals along the longitudinal direction L. That is, the first member 110 of the present modification illustrated in FIG. 2 is the first member 110 illustrated in FIG. 1 from which a part corresponding to the gap S1 is cut out. The notch constituting the gap S1 is provided from the curved part to the tip of the first hemming process part 111. In other words, a part of the first hemming process part ill that is coplanar with the flat part 112 is not cut out.

In the present modification, what becomes the second bonded part 122a to which the adhesive 130 is applied in the flange part 122 is a part from which a part corresponding to the gap S1 is excluded. In other words, the adhesive 130 is not applied to a part (a part corresponding to the gap S1) of the flange part 122 that is not in contact with the first hemming process part 111.

According to the present modification, since the gap S1 is provided between the first hemming process parts 111, the weight can be reduced as compared with the first hemming process part 111 (see FIG. 1) formed uniformly in the longitudinal direction. Since the structural member is easily crushed when an impact force is applied in the longitudinal direction, the impact absorption performance of the structural member 100 can be improved. In other words, the position and size of the gap S1 may be set based on necessary impact absorption performance. For example, the gaps S1 are not necessarily provided at equal intervals, and only the gap S1 at a specific location may be formed to be large.

(Second Modification)

A second modification of the first embodiment will be described with reference to FIGS. 3 and 4. FIG. 4 shows an exploded view of FIG. 3, but FIG. 4 omits illustration of the adhesive 130.

In the present modification, the first member 110 is provided with a first bonded part 112a, and the second member 120 is provided with a second hemming process part 123. The first hemming process part 111 of the first member 110 holds the second bonded part 122a of the second member 120, and the second hemming process part 123 of the second member 120 holds the first bonded part 112a of the first member 110. That is, the first member 110 and the second member 120 are bonded in an aspect of being held each other.

Figure 2:
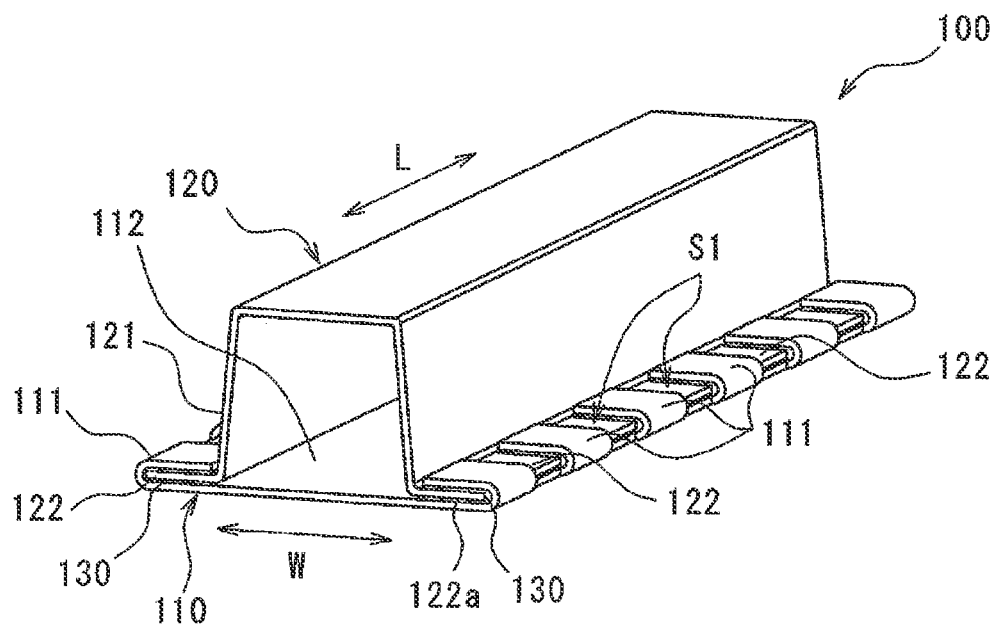
FIG. 2 is a perspective view of a structural member according to a first modification of the first embodiment.

The first member 110 is the same as that of the first modification illustrated in FIG. 2. However, a part of the both end parts of the first member 110 in the width direction W that corresponds to the gap S1 is the first bonded part 112a, and the first member 110 has a plurality of the first bonded parts 112a intermittently along the longitudinal direction L. The adhesive 130 is applied to the first bonded part 112a.

The second member 120 has a plurality of the second hemming process parts 123 intermittently along the longitudinal direction L. In other words, the second hemming process parts 123 are disposed with a gap S2 at equal intervals along the longitudinal direction L. The second hemming process part 123 is provided at a position corresponding to the first bonded part 112a (i.e., the gap S1) in the longitudinal direction L.

In the present modification, the first hemming process part 111 of the first member 110 and the second hemming process part 123 of the second member 120 have substantially the same shape, and the gap S1 of the first member 110 and the gap S2 of the second member 120 have substantially the same size. However, the sizes of the first hemming process part 111, the second hemming process part 123, and the gaps S1 and S2 are not particularly limited, and may be any shape and size.

In the structural member 100 of the present modification, the first hemming process part 111 of the first member 110 and the second hemming process part 123 of the second member 120 are alternately disposed in the longitudinal direction L. Similarly, the first bonded part 112*a* of the first member 110 and the second bonded part 122*a* of the second member 120 are alternately disposed in the longitudinal direction L.

Preferably, the material of the second member 120 has a λ value of equal to or greater than 50% similarly to the first member 110. Preferably, also regarding the curvature radius of the second hemming process part 123 of the second member 120, the value obtained by dividing the curvature radius by the plate thickness is equal to or greater than 1.0 similarly to the first hemming process part 111 of the first member. With such a definition, it is possible to suppress process defects in the second hemming process part 123 also for the second member 120 similarly to the first member 110.

According to the present modification, since the first member 110 includes the first hemming process part 111 and the first bonded part 112*a*, and the second member 120 includes the second hemming process part 123 and the second bonded part 122*a*, the first member 110 and the second member 120 are in an aspect of being held between each other, and stronger joining can be achieved.

(Third Modification)

Figure 5:
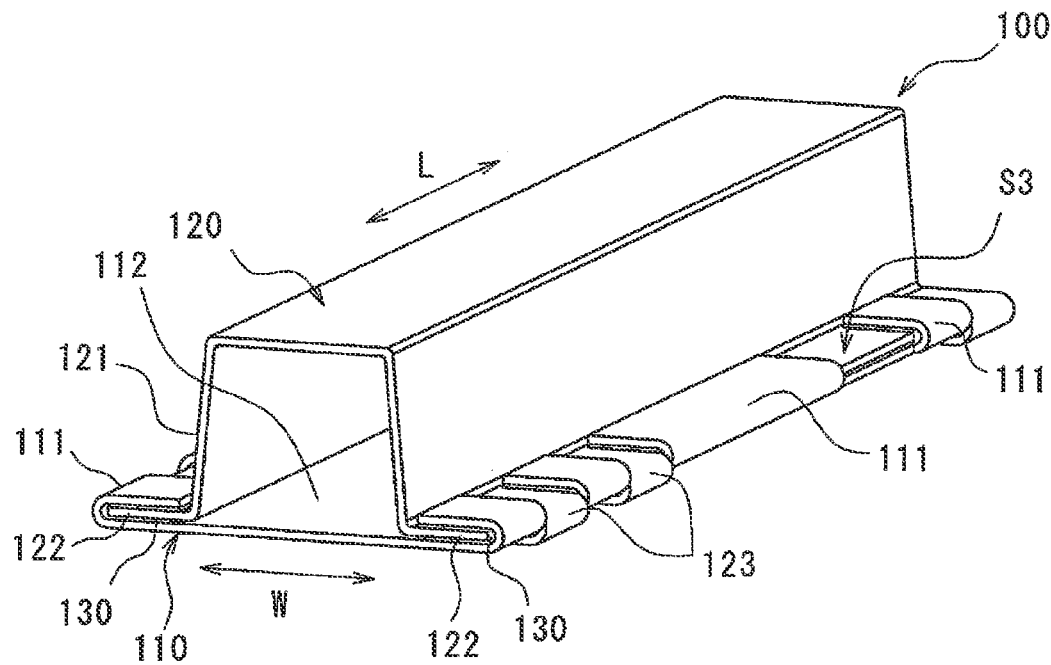
FIG. 5 is a perspective view of a structural member according to a third modification of the first embodiment.

A third modification of the first embodiment will be described with reference to FIG. 5.

Figure 3:
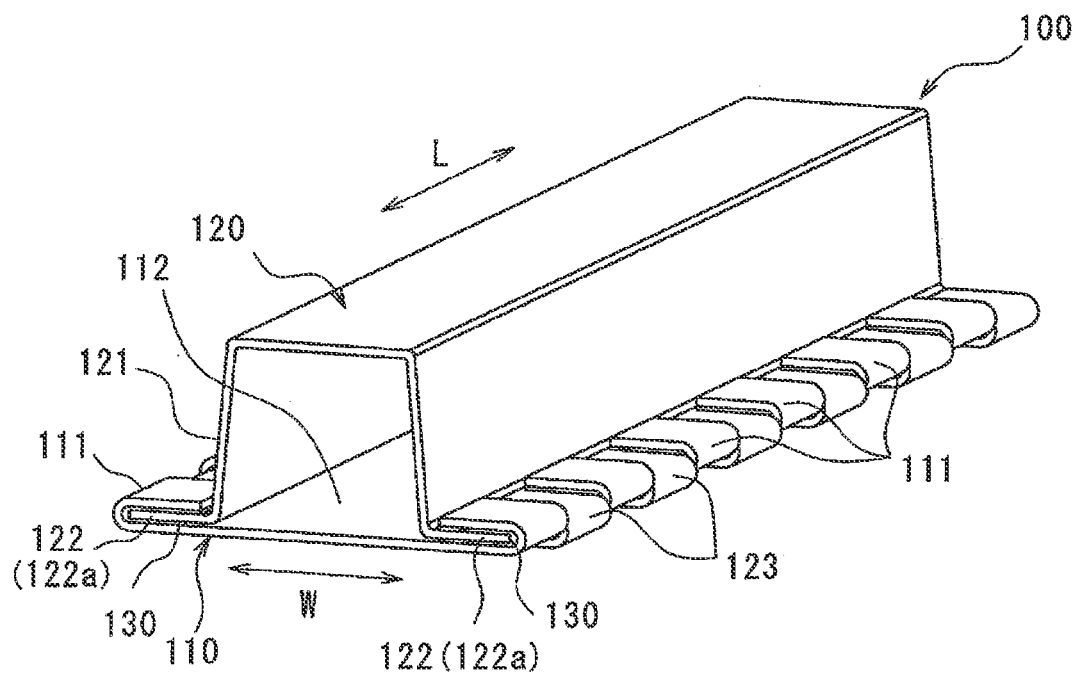
FIG. 3 is a perspective view of a structural member according to a second modification of the first embodiment.
Figure 4:
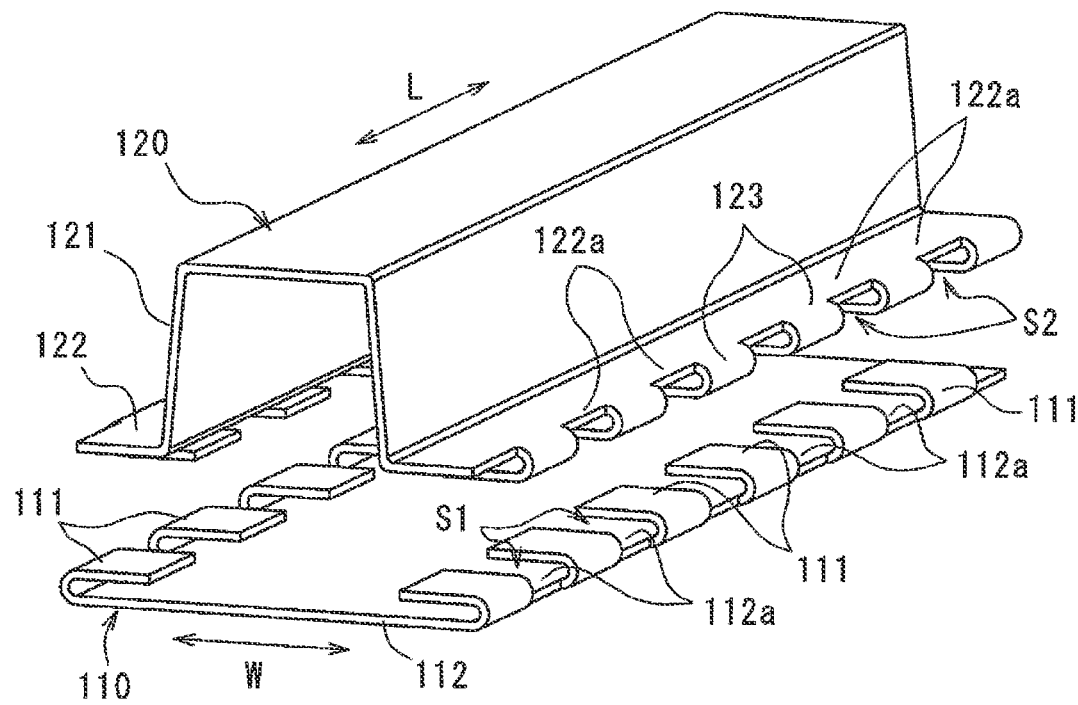
FIG. 4 is an exploded perspective view of the structural member of FIG. 3.

In the present modification, the first hemming process part 111 and the second hemming process part 123 are not disposed at equal intervals in the longitudinal direction L as compared with the second modification of FIGS. 3 and 4, and the sizes of the first hemming process part 111 and the second hemming process part 123 are also various. For example, as illustrated, a gap S3 in which the first hemming process part 111 and the second hemming process part 123 are not partially provided in the longitudinal direction L may be provided.

As in the present modification, the positions and sizes of the first hemming process part 111, the second hemming process part 123, and the corresponding first bonded part 112*a* and second bonded part 122*a* are not particularly limited, and can be various as long as suitable joining can be achieved. Therefore, the first hemming process part 111 and the second hemming process part 123 can be variously formed as necessary, and the highly versatile structural member 100 can be provided.

(Fourth Modification)

Figure 6:
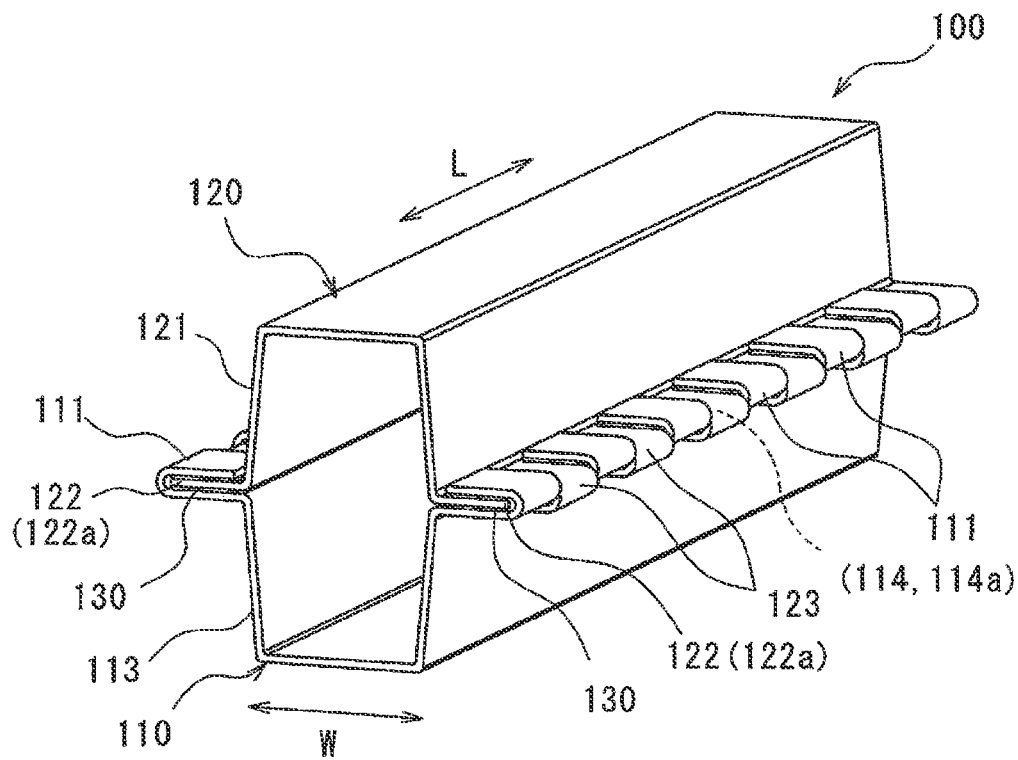
FIG. 6 is a perspective view of a structural member according to a fourth modification of the first embodiment.

A fourth modification of the first embodiment will be described with reference to FIG. 6.

In the present modification, the first member 110 has a hat shape in a cross section perpendicular to the longitudinal direction L. That is, in the present modification, two hat-shaped first member 110 and second member 120 are joined. By joining the first member 110 and the second member 120, a hexagonal closed cross-sectional shape is formed in a cross section perpendicular to the longitudinal direction L.

The second member 120 is the same as that of the second modification illustrated in FIGS. 3 and 4.

The first member 110 has substantially the same shape as that of the second member 120. That is, the first member 110 is formed by bending a flat plate so that the shape of the cross section perpendicular to the longitudinal direction L is a hat shape.

Specifically, the first member 110 has a recessed part 113 defining the closed cross-sectional shape together with the recessed part 121 of the second member 120 at the center part in the width direction W. The first member 110 has, at the both end parts in the width direction W, a flange part 114 elongated outward in the width direction W and the first hemming process part 111 subjected to hemming bending. The flange part 114 is a part held in the second hemming process part 123 of the second member 120, and is a first bonded part 114*a*. The first bonded part 114*a* and the first hemming process part 111 are alternately disposed along the longitudinal direction L. The adhesive 130 is applied to the first bonded part 114*a*. The first hemming process part 111 is provided at a position corresponding to the second bonded part 122*a* of the second member 120 in the longitudinal direction L.

As in the present modification, the two steel plates (first member 110 and second member 120) to be joined may have a hat shape. Furthermore, the shape of the first member 110 or the second member 120 can be any shape other than the hat shape.

Second Embodiment

Figure 7:
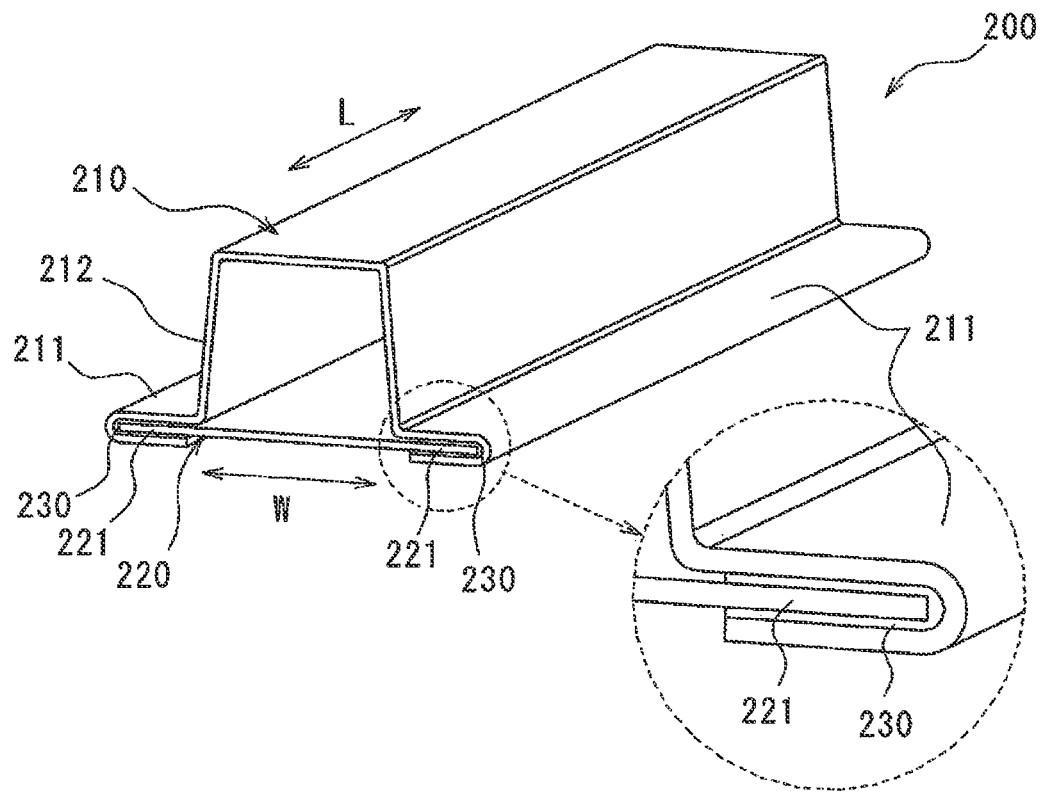
FIG. 7 is a perspective view of a structural member according to a second embodiment.

Referring to FIG. 7, a structural member 200 of the second embodiment includes a first member 210 having a hat-shaped cross section and having a first hemming process part 211, and a second member 220 that is a flat plate. By joining the first member 210 and the second member 220, a trapezoidal closed cross-sectional shape is formed in a cross section perpendicular to the longitudinal direction L. In FIG. 7, a part indicated in a broken line circle is enlarged.

The first member 210 is a steel plate having a tensile strength of equal to or greater than 980 MPa. The first member 210 is formed by bending a flat plate so that the shape of the cross section perpendicular to the longitudinal direction L is a hat shape. Specifically, the center part in the width direction W is provided with a recessed part 212 defining a closed cross-sectional shape together with the second member 220, and the both end parts in the width direction W are provided with the first hemming process part 211 elongated outward in the width direction W and subjected to hemming bending.

Also in the present embodiment, similarly to the first embodiment, regarding the curvature radius of the first hemming process part 211 of the first member 210, the value obtained by dividing the curvature radius by the plate thickness is set to equal to or greater than 1.0. This makes it possible to suppress process defects such as cracking in the first hemming process part 211 of the first member 210.

Also in the present embodiment, similarly to the first embodiment, the material of the first member 210 has a λ value of equal to or greater than 50%. By setting the λ value to equal to or greater than 50%, it is possible to suppress process defects such as cracking in the first hemming process part 211 of the first member 210.

The second member 220 is a steel plate having a tensile strength of equal to or greater than 980 MPa. The second member 220 may be made of the same material as that of the first member 210, or may be made of a material different from that of the first member 210. The second member 220 is a rectangular flat plate that has not been subjected to bending process, and the both end parts in the width direction W are second bonded parts 221. An adhesive 230 is applied to the second bonded part 221.

In a state where the first member 210 and the second member 220 are joined, the second bonded part 221 of the second member 220 is held in the first hemming process part 211 of the first member 210. Bonding between the second bonded part 221 and the first hemming process part 211 is performing not using welding or mechanical fastening but using the adhesive 230. As the adhesive 230, a general-purpose adhesive can be used, but it is preferable to use a thermosetting adhesive in particular. This can achieve strong joining. Alternatively, the adhesive 230 having room-temperature curability may be used.

According to the present embodiment, the same operations and effects as those of the first embodiment are achieved. As exemplified in the first embodiment and the present embodiment, the first member 210 or the second member 220 can have various shapes. In the second embodiment in particular, since the second member 220 is a simple flat plate, complicated process is not required for the second member 220.

(Modification)

Figure 8:
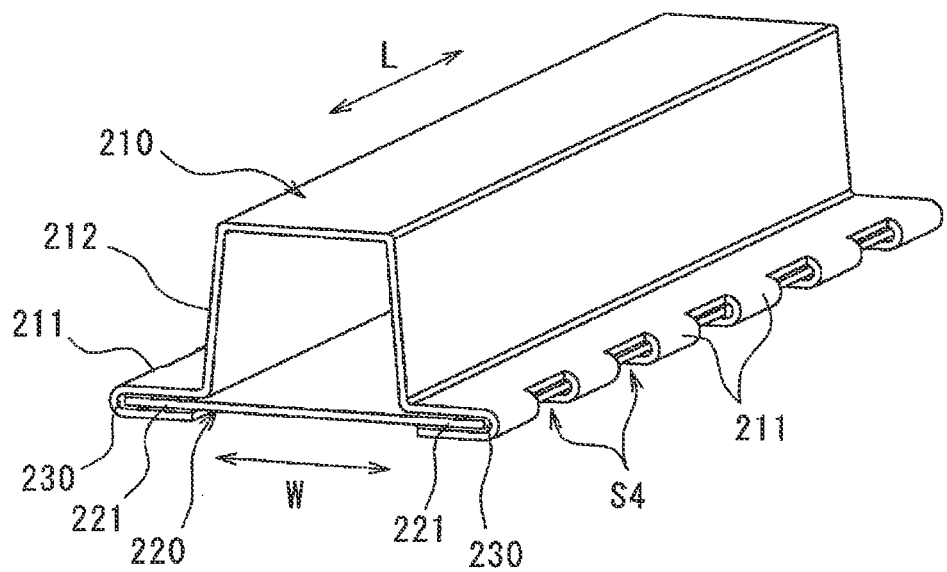
FIG. 8 is a perspective view of a structural member according to a modification of the second embodiment.

A modification of the second embodiment will be described with reference to FIG. 8.

In the present modification, in the first member 210, a plurality of the first hemming process parts 211 are intermittently disposed along the longitudinal direction L. The first hemming process parts 211 are disposed with a gap S4 at equal intervals along the longitudinal direction L. That is, the first member 210 of the present modification illustrated in FIG. 8 is the first member 210 illustrated in FIG. 7 from which a part corresponding to the gap S4 is cut out. The notch constituting the gap S4 is provided from the curved part to the tip of the first hemming process part 211.

According to the present modification, the same operations and effects as those of the first modification (see FIG. 2) of the first embodiment are achieved. That is, weight reduction and high impact absorption performance can be achieved.

Although specific embodiments of the present invention and modifications thereof have been described above, the present invention is not limited to the above forms, and various modifications can be made within the scope of the present invention. For example, an embodiment of the present invention may be obtained by appropriately combining the contents of individual embodiments and modifications. In each of the above embodiments, an example of joining by an adhesive without welding or mechanical fastening has been described, but, for example, welding and an adhesive can be used in combination.

The invention claimed is:

1. A structural member comprising:
a first member made of a steel plate; and
a second member made of a steel plate,
the structural member being elongated in a longitudinal direction, the first member and the second member being joined, wherein
a closed cross-sectional shape is formed by the first member and the second member in a cross section perpendicular to the longitudinal direction,
the first member has a tensile strength of equal to or greater than 980 MPa, and includes a first hemming process part having a bent hem at each of a pair of opposed end parts in a width direction orthogonal to the longitudinal direction,
the second member has a tensile strength of equal to or greater than 980 MPa, and includes a second bonded part held in the first hemming process part at each of the pair of opposed end parts in the width direction and bonded to the first hemming process part by an adhesive, and
a plurality of the first hemming process parts are intermittently disposed along the longitudinal direction.

2. The structural member according to claim 1, wherein a λ value of the first member is equal to or greater than 50%.

3. The structural member according to claim 1, wherein a value obtained by dividing a curvature radius of the first hemming process part by a plate thickness is equal to or greater than 1.0.

4. The structural member according to claim 1, wherein the adhesive has a thermosetting property.

5. The structural member according to claim 1, wherein the adhesive has room-temperature curability.

6. The structural member according to claim 1, wherein the first member includes a plurality of first bonded parts intermittently along the longitudinal direction,
the second member includes a plurality of second hemming process parts intermittently along the longitudinal direction, and
the first bonded part of the first member is held in the second hemming process part of the second member and bonded to the second hemming process part of the second member with an adhesive.

7. The structural member according to claim 6, wherein a λ value of the second member is equal to or greater than 50%.

8. The structural member according to claim 6, wherein a value obtained by dividing a curvature radius of the second hemming process part by a plate thickness is equal to or greater than 1.0.

9. The structural member according to claim 6, wherein the first hemming process part of the first member and the second hemming process part of the second member are alternately disposed in the longitudinal direction, and
the first bonded part of the first member and the second bonded part of the second member are alternately disposed in the longitudinal direction.

10. The structural member according to claim 1, wherein the first member has a flat plate shape, and
the second member has a hat-shaped cross section perpendicular to the longitudinal direction.

11. The structural member according to claim 1, wherein the first member has a hat-shaped cross section perpendicular to the longitudinal direction, and
the second member has a flat plate shape.

12. The structural member according to claim 1, wherein both the first member and the second member have a hat-shaped cross section perpendicular to the longitudinal direction.

13. The structural member according to claim 1, wherein the structural member is for a vehicle.

14. The structural member according to claim 2, wherein a value obtained by dividing a curvature radius of the first hemming process part by a plate thickness is equal to or greater than 1.0.

15. The structural member according to claim 2, wherein the adhesive has a thermosetting property.

16. The structural member according to claim 2, wherein the adhesive has room-temperature curability.

17. The structural member according to claim 2, wherein
the first member includes a plurality of first bonded parts intermittently along the longitudinal direction,
the second member includes a plurality of second hemming process parts intermittently along the longitudinal direction, and
the first bonded part of the first member is held in the second hemming process part of the second member and bonded to the second hemming process part of the second member with an adhesive.

18. The structural member according to claim 2, wherein a $\lambda$ value of the second member is equal to or greater than 50%.

* * * * *